United States Patent
Leung et al.

[11] Patent Number: 5,952,589
[45] Date of Patent: Sep. 14, 1999

[54] SOFT LANDING METHOD FOR PROBE ASSEMBLY

[75] Inventors: Arthur T. Leung, Rancho Santa Fe; Michael S. Sheaffer, Escondido; Edward A. Neff, Rancho Santa Fe; Michael A. Ferris, Vista; Kieran Boyle; Christopher Johnson, both of San Diego; Joseph M. Quashnock, Carlsbad, all of Calif.

[73] Assignee: Systems, Machines, Automation Components Corporation, Carlsbad, Calif.

[21] Appl. No.: 08/587,878

[22] Filed: Jan. 11, 1996

[51] Int. Cl.$^6$ .............................. G01M 19/00; G01B 3/00
[52] U.S. Cl. ............................. 73/865.8; 33/558; 33/561
[58] Field of Search ............................. 73/866.5, 865.8; 33/558, 561

[56] References Cited

U.S. PATENT DOCUMENTS

| | | |
|---|---|---|
| 3,743,093 | 7/1973 | Klancnik . |
| 3,987,551 | 10/1976 | Kienle ................................. 33/169 R |
| 3,993,565 | 11/1976 | Holthuis . |
| 4,215,301 | 7/1980 | Mason . |
| 4,484,118 | 11/1984 | Manabe et al. . |
| 4,498,023 | 2/1985 | Stout . |
| 4,575,652 | 3/1986 | Gogue . |
| 4,750,272 | 6/1988 | Caddell . |
| 4,784,539 | 11/1988 | Lehmkuhl ................................. 33/558 |
| 4,809,430 | 3/1989 | Maruyama et al. . |
| 4,821,460 | 4/1989 | Wegmann ................................. 73/660 |
| 5,012,591 | 5/1991 | Asakawa ................................. 33/558 |
| 5,175,456 | 12/1992 | Neff et al. . |
| 5,310,064 | 5/1994 | Neff et al. . |
| 5,315,189 | 5/1994 | Neff et al. ................................. 310/12 |
| 5,317,222 | 5/1994 | Neff et al. . |
| 5,399,983 | 3/1995 | Nagasawa ............................. 324/758 |
| 5,414,620 | 5/1995 | Kauffman . |
| 5,430,360 | 7/1995 | Rosenthal et al. . |
| 5,446,323 | 8/1995 | Neff et al. . |
| 5,517,190 | 5/1996 | Gunn ................................. 33/561 |
| 5,691,461 | 11/1997 | Goldmann et al. ................. 73/105 |

FOREIGN PATENT DOCUMENTS

| | | |
|---|---|---|
| 0 277 656 | 10/1988 | European Pat. Off. . |
| 3831974 | 3/1990 | Germany . |

*Primary Examiner*—Hezron Williams
*Assistant Examiner*—Chad Soliz
*Attorney, Agent, or Firm*—Nydegger & Associates

[57] ABSTRACT

A method and device for moving a probe assembly into soft contact with a work surface includes initially placing the probe into an approach position. Advancement of the probe along a substantially perpendicular path toward the work surface is then controlled by applying a restraining force on the probe. This resisting force is decreased until the weight of the probe assembly just overcomes the static friction forces that are acting on the probe. After the static friction forces are overcome, the probe advances along a path toward the work surface. By monitoring this advancement, soft contact of the probe with the work surface can be determined when the velocity of the probe changes to zero. First, the position of the probe can be monitored to advance the probe along the path through a known travel distance. Second, the velocity of probe advancement can be monitored to indicate soft contact when velocity changes to zero. Third, accelerations of the probe can be monitored to indicate soft contact when the acceleration exceeds a predetermined threshold. Fourth, a load sensor can be placed on the probe to indicate soft contact when the load sensor generates a predetermined value. And, finally, soft contact can be accepted as being consequential of the advancement.

9 Claims, 3 Drawing Sheets

SOFT LANDING METHOD FOR PROBE ASSEMBLY

FIELD OF THE INVENTION

The present invention pertains generally to machines which are useful for assembling or manufacturing an end product. More particularly, the present invention pertains to methods for controlling the forces that move assembly machine parts during assembly or manufacture of the end product. The present invention is particularly, but not exclusively, useful for the manufacture of end products which incorporate very delicate or fragile components that require soft contact forces during assembly of the end product.

BACKGROUND OF THE INVENTION

From basic mechanics it is well known that a force is the action of one body on another body. In many circumstances, just how generated forces alter or affect a body can be of great concern. Most certainly, this concern is present whenever machines are designed which have moving parts. Further, the concern is present whenever machines are used to assemble component parts into an end product.

With the above in mind, it is helpful to review some basic mechanical concepts. According to Newton's first law, if the resultant force acting on a body is zero, the body will remain at rest (static condition) or move in a straight line with a constant velocity (dynamic condition). According to Newton's second law, if the resultant force acting on a body is not zero, the body will have an acceleration which is proportional to the magnitude of the resultant and in the direction of this resultant force. Stated differently, F=ma, where F represents a resultant force vector acting on the body, m is the mass of the body, and a is the acceleration vector of the body. As will be more fully appreciated in the discussion which follows, the present invention relies on notions inherent in the mechanical concepts set forth above for the control of moving parts in an assembly and manufacturing machine. When considering the operation of a machine that is to be used for the purpose of either assembling separate individual component parts into an end product, or moving a tool into contact with a work surface of the end product, the consequences of the manufacturing process on the end product must be addressed. For example, consider a machine used for the manufacture of an end product which incorporates a probe assembly that is to be moved, for whatever purpose, into contact with a work surface on the end product. Since the machine will necessarily operate to move one body (the probe assembly) into contact with another body (the work surface of the end product), forces will be generated against both bodies by this action. It happens, however, that many end products incorporate very delicate and fragile components which could be easily damaged if the contact forces that are generated during assembly of the end product become too great. Consequently, in order to avoid damage to the end product, it is often desirable that only very small magnitude forces be generated against specified component parts of the end product during its assembly or manufacture.

The present invention recognizes that by monitoring certain measurable values of the movement parameters of a particular machine part, the contact forces between the machine part and components of the end product being manufactured can be accurately controlled and thereby minimized. Stated differently, based on the basic mechanical concepts set forth above, the present invention recognizes that the measurable values of the movement parameters of the machine part which can be monitored to control the machine part are all force related.

In light of the above, it is an object of the present invention to provide a method and a device for moving a probe assembly into soft contact with a work surface which selectively monitors specified movement parameters of the probe assembly to ensure soft contact between the probe assembly and the work surface. It is another object of the present invention to provide a method and device for moving a probe assembly into soft contact with a work surface which relies on selective modes of operation that respectively require position control, or velocity control, or torque control with acceleration information of the probe assembly to ensure soft contact between the probe assembly and the work surface. Still another object of the present invention is to provide a method and device for moving a probe assembly into soft contact with a work surface which prevents damage to the work surface. Yet another object of the present invention is to provide a method and device for moving a probe assembly into soft contact with a work surface that will provide precision measurements of the work surface or in relation to the work surface. Still another object of the present invention is to provide a method for moving a probe assembly into soft contact with a work surface which is easy to execute and comparatively cost effective.

SUMMARY OF THE INVENTION

In accordance with the present invention, a method for moving a probe assembly into soft contact with a work surface begins with the placement of the probe assembly or a component part that is being held by the probe assembly. For the present invention this initial placement will be identified as being accomplished when the probe is at an approach position. This approach position can be arbitrarily established in accordance with the desires of the operator, but preferably, the approach position places the probe assembly much closer than about one millimeter away from the work surface. In any event, the probe assembly is placed at the approach position for subsequent movement along a path from the approach position into soft contact with a predetermined point on the work surface.

Initially, the probe assembly is held stationary at the approach position. Then, the forces which are acting to hold the probe assembly stationary are changed in magnitude until the inherent static friction forces that have been acting on the stationary probe assembly are overcome. When the static friction forces have been overcome, the system becomes dynamic and the probe assembly advances toward the work surface under the influence of the resultant force.

In accordance with the present invention, as the probe assembly is advanced toward the work surface, it is monitored to determine when soft contact is made with the work surface. Specifically, several control modes of operation for determining soft contact are possible for the present invention. In particular, each of these control modes depends on a measurable parameter that is characteristic of the movement of the probe assembly. These measurable parameters include i) the probe's travel position on the path toward the work surface (position control mode), ii) its velocity (velocity control mode), and iii) the acceleration/ deceleration of the probe assembly (torque control mode). Further, a load sensor can be mounted on the probe assembly and monitored for activation to indicate soft contact. In an alternate operation for the present invention, none of the above mentioned measurable parameters are monitored and, instead, the probe assembly is allowed to merely advance into soft contact with the work surface under the influence of the resultant force (basic mode).

For a position control mode of operation, an optical encoder, or any type feedback device that is well known in the pertinent art, can be used to monitor the position of the probe assembly relative to the approach position. In this position control mode, an estimate is first made of the actual distance between the approach position and the work surface. The probe assembly is then allowed to advance toward the work surface under the influence of the resultant force. This advancement, however, is allowed only through a travel distance that is slightly greater than the estimated distance. Soft contact is determined to have occurred after the probe assembly has traversed the travel distance.

In a velocity control mode of operation, the output from the encoder, or other feedback device, is coupled with the output from a timer or clock to obtain the velocity of the probe assembly as it advances toward the work surface. Again, as in the position control mode, the probe assembly is advanced toward the work surface under the influence of the resultant force. In this mode, however, soft contact is determined to have occurred when the velocity of the probe assembly is equal to zero.

An acceleration or torque control mode of operation is also provided as a modification of the velocity control mode. In this mode the time rate of change of velocity, i.e. acceleration, is monitored using the encoder and the timer. Because soft contact will result in an acceleration of the probe assembly (actually a deceleration), a determination that soft contact has occurred can be made when this acceleration exceeds a predetermined threshold value.

As implied above, the actual soft contact force between the probe assembly and the work surface can be monitored. This is done with a load sensor which can be mounted directly onto the probe assembly. In this mode of operation, activation of the load sensor determines when soft contact has been accomplished.

In addition to the above mentioned modes of operation, there is always the basic case wherein the probe assembly is not monitored after it departs from the approach position. With no monitoring of the probe assembly, the operator accepts the contact between the probe assembly and the work surface as being a soft contact. As with all of the above mentioned modes of operation, the probe assembly is advanced toward the work surface under the influence of the resultant force. Importantly, for all modes of operation in the methods of the present invention, the resultant force is that force which is just necessary to overcome the static friction forces.

BRIEF DESCRIPTION OF THE DRAWINGS

The novel features of this invention, as well as the invention itself, both as to its structure and its operation will be best understood from the accompanying drawings, taken in conjunction with the accompanying description, in which similar reference characters refer to similar parts, and in which.

DESCRIPTION OF THE PREFERRED EMBODIMENTS OF THE INVENTION

Figure 1:
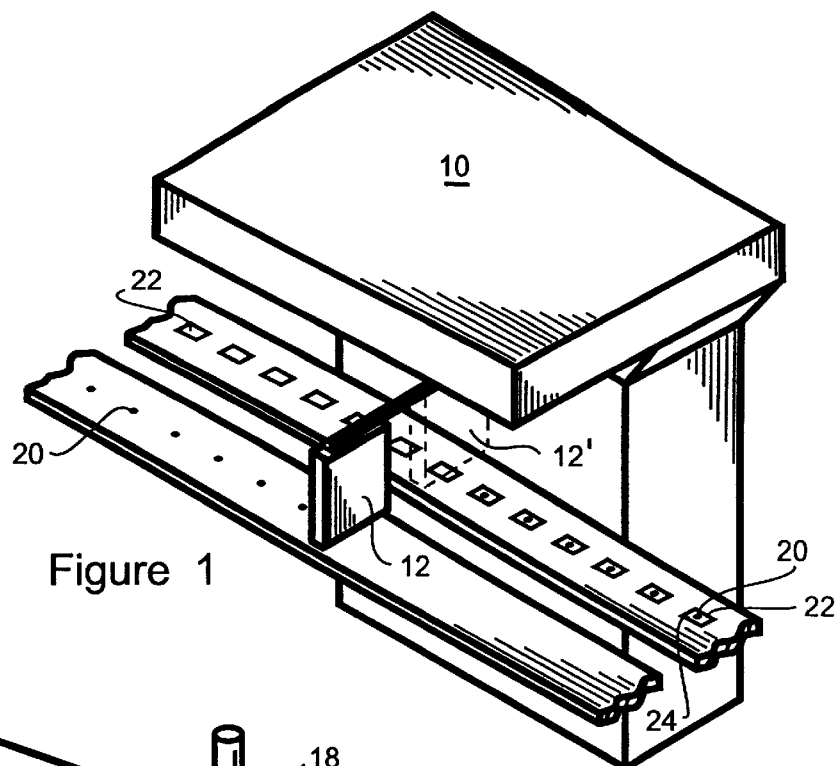
FIG. 1 is a perspective view of a device which is useful for practicing the methods of the present invention.

Referring initially to FIG. 1 a device for performing the methods of the present invention is shown and generally designated 10. As shown, the device 10 includes a linear motor of a type similar to the one disclosed and claimed in U.S. Pat. No. 5,446,323 which issued to Neff et al. for an invention entitled "Actuator with Translational and Rotational Control", and which is assigned to the same assignee as the present invention.

Figure 2:
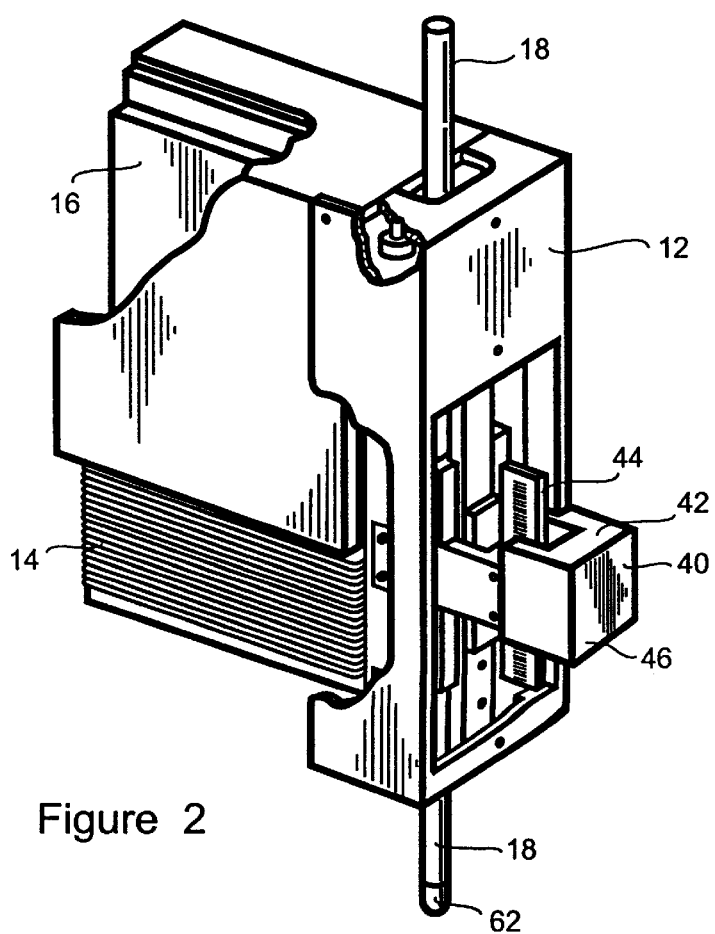
FIG. 2 is a perspective view of a voice coil actuator from the device shown in FIG. 1 with portions broken away for clarity.

In FIG. 2 the actuator 12 is more clearly shown to include a reciprocating coil 14 which surrounds a magnet 16. In a manner well known in the pertinent art, when an electrical current is passed through the coil 14, a flux field is established which interacts with the magnetic flux field of the magnet 16. As is also well known, this interaction creates forces on the coil 14. Depending on the amount and direction of current flow in the coil 14, the magnitude and direction of the forces that are created on the coil 14 can be controlled to move the coil. Thus, the coil 16 can be made to reciprocate. If, as intended for the present invention, a probe assembly 18 is connected directly to the coil, the probe assembly 18 will move and reciprocate with the coil 14. Furthermore, with proper reciprocation of the probe assembly 18 by the actuator 12, and with a coordinated movement of the actuator 12 by the device 10 (such as is suggested in FIG. 1 for movement of actuator 12 to and from the position of actuator 12') the probe assembly 18 can be operated to place a component 20 into proper position on a work surface 22. As can be easily appreciated, such action could be used to create an end product 24.

The present invention, however, it is not an assembly process per se. Instead, it is the control of contact forces between probe assembly 18 and component 20, and the subsequent contact force between probe assembly 18 and/or component 20 and work surface 22 that is of concern. In order to appreciate the nature of the forces which act on probe assembly 18, and thus the nature of the forces that are to be controlled in accordance with the methods of the present invention, a brief review of frictional forces will be helpful. To this end, consider FIG. 3A wherein the body 26 is shown to have a weight W and to be resting on a surface 28.

Figure 3A:
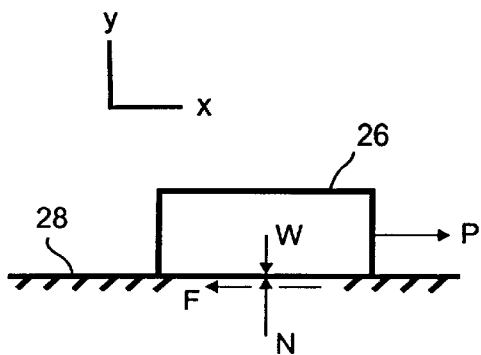
FIG. 3A is a free body diagram of a block resting on a surface.

From basic equations of equilibrium it is known that, for a static equilibrium condition such as the condition shown in FIG. 3A, the sum of forces in both the x and the y directions must equal zero. Thus, the weight W of body 26 is equal to the normal force N. Static equilibrium equations also indicate that, for equilibrium in the x direction, the push/pull force P must be equal to the friction force F. The equation is:

$$P - F = 0 \qquad \text{(Eqn \#1)}$$

Figure 3B:
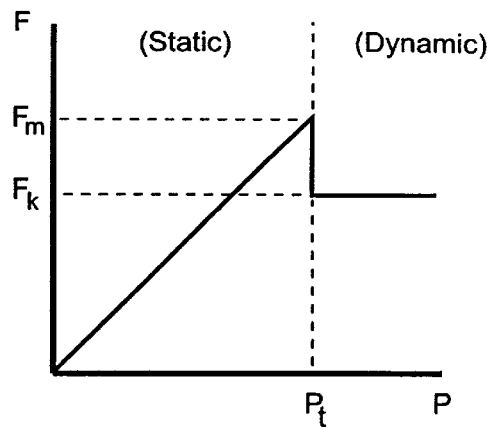
FIG. 3B is a graph showing the relationship between static friction and kinetic friction.

This, however, is true only for static equilibrium. In fact, with reference to FIG. 3B, it will be seen that as P is increased from zero, F is equal to P only up to the point where the push/pull force P is equal to the maximum static frictional force ($F_m$). Thus, while the body 26 is in static equilibrium, F will vary directly with changes in P. However, just as P exceeds $F_m$, a transition push/pull force ($P_t$) is placed on the body 26 and static conditions no longer pertain. At this point, under the influence of $P_t$, the condition of body 26 transitions from a static condition to a dynamic condition. Stated differently, the maximum static friction force $F_m$ has been overcome and the body 26 begins to move. Further, as also shown in FIG. 3B, it happens that after the body 26 begins to move, the kinetic friction force $F_k$ is less than the maximum static friction force $F_m$. Due to this difference, the push/pull force $P_t$ will cause the body 26 to accelerate. Recall, F=ma.

Figure 4A:
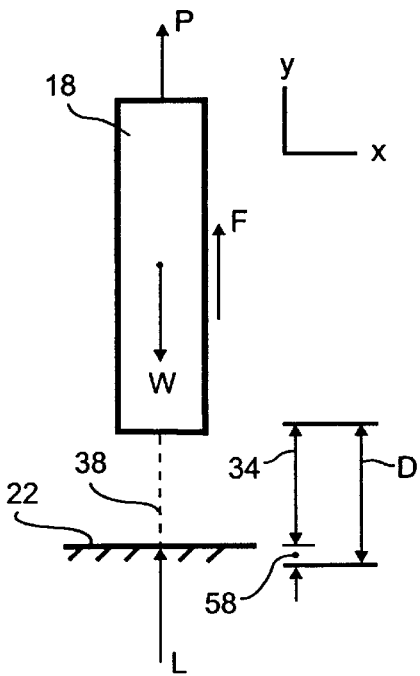
FIG. 4A is a free body diagram of the probe assembly of the actuator shown in FIG. 2 with the probe assembly in a vertical orientation.

With the above in mind, first consider the free body diagram of probe assembly 18 as it is shown in FIG. 4A. In this free body diagram, all of the forces which act on the probe assembly 18 are shown for the specific condition when the probe assembly 18 is stationary. More specifically, FIG. 4A shows probe assembly 18 while it is held vertically above the work surface 22 in an approach position preparatory to contact with work surface 22. The forces acting on probe assembly 18 in this condition are i) its weight W, ii) all friction forces which are represented by F, and iii) the activating push/pull force P.

Still referring to FIG. 4A it will be appreciated that an equation of static equilibrium the probe assembly 18 in the y direction will be:

$$P+F-W=0 \qquad \text{(Eqn \#2)}$$

For purposes of the present invention it is to be appreciated that the push/pull force P essentially represents the torque which is exerted on probe assembly 18 by the interaction between coil 14 and magnet 16. The friction forces F, then, is the sum of all other mechanical forces which combine to resist any reciprocal movement of the probe assembly 18 in actuator 12.

Figure 4B:
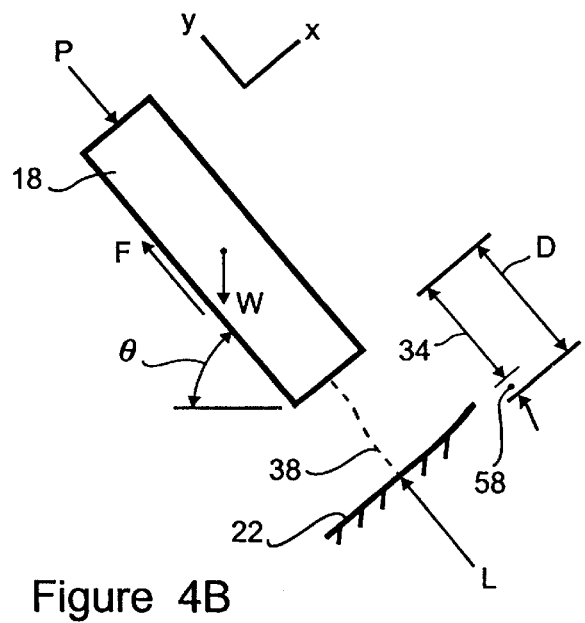
FIG. 4B is a free body diagram of the probe assembly of the actuator shown in FIG. 2 with the probe assembly in an angled orientation.

Since probe assembly 18 need not always be vertically oriented as shown in FIG. 4A, consider also the more generalized free body diagram of probe assembly 18 that is shown in FIG. 4B. By comparing FIG. 4A with FIG. 4B it will be seen that a change in the orientation of probe assembly from a vertical orientation (FIG. 4A) to an angled (FIG. 4B) causes a change in the direction that weight W acts on probe assembly 18. This will also affect the magnitude of force P that is necessary to maintain static equilibrium. The point to be made is, that regardless of the orientation of probe assembly 18, several forces will continue to act in some way against the probe assembly 18. For the specific condition shown in FIG. 4B, the equation of static equilibrium for probe assembly 18 in the y direction will be:

$$P+F-W \sin \theta=0 \qquad \text{(Eqn \#3)}$$

Again, P is the push/pull torque force caused by the interaction of coil 14 with magnet 16, and the friction force F represents all forces which resist movement of probe assembly 18 on actuator 12. The angle $\theta$ is representative of the angle at which the probe assembly 18 is oriented in the approach position relative to a horizontal orientation. For example, in FIG. 4A, when probe assembly 18 is held vertically, the angle $\theta$ is equal to 90° and $\sin \theta$ is equal to 1. Thus, Eqn #2.

Figure 5:
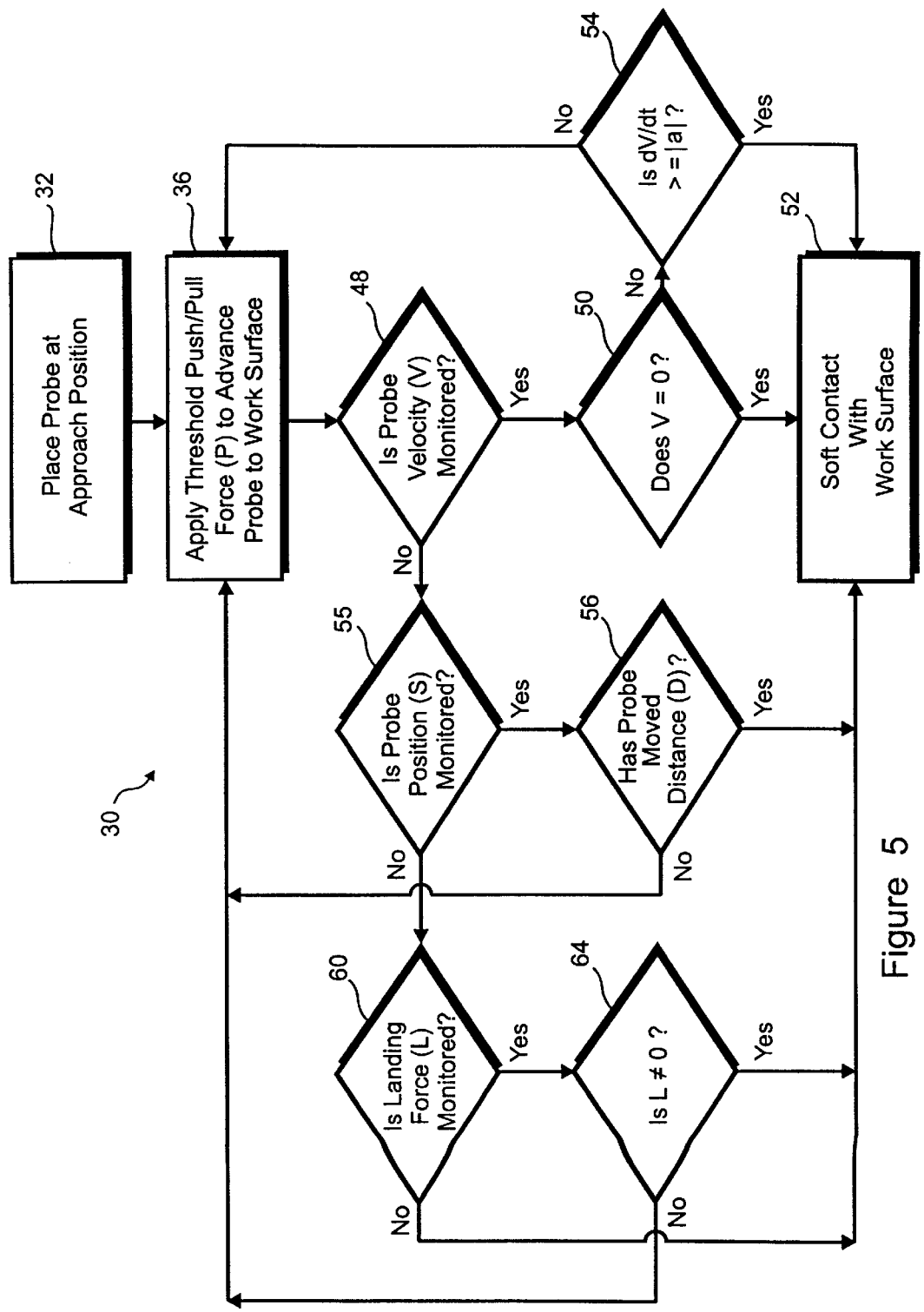
FIG. 5 is a logic flow chart of the steps used in practicing the methods of the present invention.

Referring now to FIG. 5, the method of the present invention is shown as a logic flow chart and is generally designated 30. To begin method 30, as indicated at box 32, the probe assembly 18 is placed at an approach position. More specifically, to accomplish this step of method 30 the probe assembly 18 is moved into the approach position by the action of actuator 12. It may then, but not necessarily, be held stationary while in the approach position. As indicated above, the approach position can be arbitrarily selected by the operator. For purposes of discussion here, however, an approach position is selected such that the probe assembly 18 is located at a distance 34 from work surface 22. Further, the distance 34 is preferably much less than one millimeter. This distance 34 is shown in both FIGS. 4A and 4B.

Box 36 indicates that a push/pull force (P) is to be applied to the probe assembly 18 while it is in the approach position. Further, the purpose of this push/pull force P is to advance the probe assembly 18 toward the work surface 22. The application of push/pull force (P), however, requires an appreciation of all of the other forces which are acting on probe assembly 18. Recall, that for a static equilibrium condition, the push/pull force P (i.e. torque from actuator 12) could be varied through a range. This could be done so long as the friction force F did not exceed the maximum static friction force $F_m$. With this in mind, box 36 contemplates that the push/pull force P will be appropriately changed through the operation of actuator 12 to transition the probe assembly 18 from a static to a dynamic condition, i.e. P will be adjusted until P is equal to $P_t$. Specifically, this transition involves a change from the static stationary condition of probe assembly 18 at the approach position, into a dynamic condition wherein the probe assembly 18 advances toward work surface 22 along a path 38. For example, consider the condition of probe assembly 18 as depicted in FIG. 4A. Weight W will, of course, remain constant. However, according to Eqn #2, if the sum of the push/pull force P and the friction forces F is less than the weight W, then the imbalance of forces on probe assembly 18 will disrupt its static equilibrium condition and cause the probe assembly 18 to accelerate toward work surface 22. As a practical matter, it happens that the only force in this example which is controllable by the operator of method 30 is the push/pull force P. Thus, the step in method 30 that is contemplated by box 36 is the establishment of a threshold force $P_t$ that is of sufficient magnitude, and in the proper direction, to transition probe assembly 18 from its static condition at the approach position into a dynamic condition. With this transition, the probe assembly 18 will advance toward the work surface 22.

It is to be appreciated that probe assembly 18 need not be actually stopped at the approach position during each cycle in the execution of method 30. Indeed, as contemplated by the present invention, if a value for $P_t$ has been previously established, probe assembly 18 can be in continuous motion as it passes through the approach position. To initially establish the value for a push/pull force $P_t$, the probe assembly 18 first needs to be stopped (i.e. placed in a static condition). The torque from actuator 12 is then varied to empirically determine a value for $P_t$.

Returning for the moment to FIG. 2, it will be seen that the actuator 12 of the present invention includes an encoder 40. As intended for the present invention, the encoder 40 can be of any type of position feedback sensor that is well known in the pertinent art. Here, but only for purposes of example, an optical encoder is considered, Thus, the encoder 40 includes an optical scanner 42 which is operationally associated with a scale 44 that is mounted on the probe assembly 18 for movement therewith. Additionally, a timer 46 is included in the optical encoder 40.

Through methods well known to any skilled artisan, by monitoring the scale 44, the position of probe assembly 18 relative to actuator 12 can be determined. Consequently, the position (S) of probe assembly 18 along path 38 can also be determined. Albeit, approximately. Further, by comparing changes in the position S of probe assembly 18 with predetermined intervals of time that are established by the timer 46 (i.e. dS/dt), the velocity (V) of probe assembly 18 along path 38 can also be determined. Still further, by monitoring the time rate of change in its velocity V (i.e. dV/dt),the accelerations (a) of probe assembly 18 along path 38 can be determined.

Returning now to FIG. 5, after the push/pull force P has been applied to the probe assembly 18, box 48 of method 30 shows that an inquiry is made as to whether the velocity V of probe assembly 18 is monitored. If the answer to this inquiry is yes, box 50 then indicates that the next question concerns whether this velocity is equal to zero. If so, box 52 shows that a soft contact has been made. For purposes of identification and differentiation, this mode of operation in method 30 is sometimes referred to herein as the velocity mode.

A refinement of the velocity mode of operation for the present invention can be made by maintaining the velocity at a constant magnitude. One advantage of this refinement is that it allows for compensation of small changes in the friction forces F which oppose advancement of the probe assembly 18. There are many well known feedback variations which could be used for this purpose. For each variation, however, it is necessary to monitor both the velocity and the torque value for the push/pull force P which is necessary to maintain the constant velocity. Further, once the force P exceed a predetermined value, it must be determined or concluded that soft contact with the work surface has occurred. Otherwise, an excessive force P could be called upon which could easily damage the work surface.

Going back to box 50, it can be seen that if the velocity V of probe assembly 18 is not monitored for a zero value but is, instead, monitored for changes to determine accelerations of the probe assembly 18, then box 54 shows that an acceleration on probe assembly 18 which is above a predetermined absolute value will indicate a soft contact of the probe assembly 18 with work surface 22. This mode of operation in method 30 is sometimes referred to as the acceleration control mode.

Returning to box 48 of method 30, if the velocity V of probe assembly 18 is not specifically monitored, the inquiry is made at box 55 as to whether the position S of probe assembly 18 is monitored. If so, box 56 inquires as to whether the probe assembly 18 has moved along the path 38 through a distance D. To determine distance D, it is first necessary to make an estimate of the distance 34 between the work surface 22 and the probe assembly 18. This estimate is made with the probe assembly 18 in the approach position and can be incorporated into the set up of device 10. Regardless what the estimate for distance 34 may be, an incremental overshoot distance 58 (see FIGS. 4A and 4B) is added to the distance 34 to establish distance D. For purposes of the present invention, the overshoot distance 58 can be on the order of about one ten thousandth of an inch (0.0001 in.), and preferably even less. Soft contact of the probe assembly 18 with work surface 22 will then be determined as having occurred when the probe assembly 18 has traveled along path 38 through the distance D. An important consideration in this mode of operation for method 30 is that the encoder 40 can accurately measure the distances that have been traveled by probe assembly 18 along path 38. The encoder 40, however, does not measure the distance 34 that is characteristic of the approach position. This mode of operation is sometimes referred to as the position control mode.

It will be appreciated that the position control mode can also be used, in conjunction with a clock (not shown) which will measure the time which has transpired after the probe assembly 18 has been monitored as being in a particular position. With this knowledge, it is also contemplated by the present invention that the passage of time after probe assembly 18 leaves the approach position can be used to determine whether soft contact has occurred. In this operational mode, the probe assembly 18 is established in the approach position, it is then released under the influence of push/pull force $P_r$, and after the passage of a predetermined time interval soft contact is accepted as having occurred.

FIG. 5 also indicates at box 60 that the landing force L (i.e. the actual force at contact between probe assembly 18 and work surface 22) can be monitored to determine whether the probe assembly 18 has made soft contact with the work surface 22. This mode of operation requires the use of a load sensor 62 which can be mounted on probe assembly 18, such as is shown in FIG. 2. For purposes of the present invention, load sensor 62 can be of any type well known in the pertinent art, such as a type manufactured by Futek. As indicated by box 64 of method 30, when a load sensor 62 is incorporated into probe assembly 18, a soft contact between the probe assembly 18 and the work surface 22 will be determined upon the activation of load sensor 62. Stated differently, the presence of a landing force L will activate the load sensor 62 to determine soft contact.

Method 30 also indicates that soft landing can be determined when no measurable parameters of the movement of probe assembly 18 are specifically monitored. For this mode or operation, the inquiries at boxes 48, 54 and 60 all receive negative responses. Thus, neither velocity V, nor position S, nor landing force L are monitored. This is a so-called basic case wherein soft contact is to be accepted as having occurred after the proper push/pull force P has been established to advance probe assembly 18 toward work surface 22. Recall, for all of the modes discussed here, including the basic case, the push/pull force P is applied to the probe assembly 18 while the probe assembly 18 is in the approach position. Further, the push/pull force P is established as being the force P, with appropriate magnitude and direction, which is just necessary to transition the probe assembly 18 from a static condition to a dynamic condition.

Further to the above, the method 30 of the present invention contemplates an ability to selectively use a particular mode of operation. This selection will, of course, depend upon the needs and desires of the operator. Further, regardless which mode of operation is to be used, the methods of the present invention contemplate that soft contact can be made with landing forces of below fifty grams (50 gm), and conceivable as low as approximately one hundredth of a gram (0.01 gm). Further, after soft contact has been determined, it is also within the contemplation of the present invention that the push/pull force P can be appropriately altered to maintain the static contact force between the probe assembly 18 and the work surface 22 at a value equal to, or nearly equal to, the soft contact landing force L. On the other hand, push/pull force P can be altered after soft contact to create whatever force is desired between probe assembly 18 and work surface 22.

While the particular method and device for moving a probe assembly into soft contact with a work surface as herein shown and disclosed in detail is fully capable of obtaining the objects and providing the advantages herein before stated, it is to be understood that it is merely illustrative of the presently preferred embodiments of the invention and that no limitations are intended to the details of the construction or design herein shown other than as defined in the appended claims.

We claim:

1. A method for moving a probe assembly along a substantially linear path into soft contact with a work surface which comprises the steps of:

moving said probe assembly into an approach position, said approach position being at a predetermined distance from said work surface;

applying an activating force on said probe assembly at said approach position in a direction substantially aligned with the path, said activating force being substantially equal to a threshold force necessary to maintain said probe assembly in a static condition on the path;

decreasing said activating force, until said static condition of said probe assembly is changed to a dynamic condition, to advance said probe assembly through said predetermined distance along the path from said approach position to said work surface, wherein said advancement has a velocity;

measuring said velocity of said advancement; and determining soft contact of said probe assembly with said work surface as being when said velocity is equal to zero.

2. A method as recited in claim 1 further comprising the step of applying an additional force to said probe assembly to urge said probe assembly against said work surface while said probe assembly is in contact with said work surface.

3. A method as recited in claim 1 wherein said path is substantially perpendicular to said work surface.

4. A method as recited in claim 1 wherein said predetermined distance is less than approximately one millimeter.

5. A method as recited in claim 1 wherein said threshold force is less than five hundred grams.

6. A method for moving a probe assembly along a substantially linear path into soft contact with a work surface which comprises the steps of:

applying a first force in a direction substantially aligned with the path to move said probe assembly into an approach position on the path, said approach position being at a predetermined distance from said work surface;

applying a second force on said probe assembly in a direction substantially aligned with the path at said approach position for an advancement of said probe assembly through said distance at a velocity along a substantially linear path from said approach position to said work surface, said second force having a magnitude which transitions said probe assembly from a static condition to a dynamic condition on the path; and monitoring said velocity to determine when said probe assembly makes said soft contact with said work surface.

7. A method as recited in claim 6 wherein soft contact of said probe assembly with said work surface is determined when velocity is equal to zero.

8. A device for moving a probe assembly along a substantially linear path into soft contact with a work surface which comprises:

a directing means for placing said probe assembly into an approach position on the path, said approach position being at a predetermined distance from said work surface;

a force generating means for applying an activating force on said probe assembly at said approach position, said activating force being substantially equal to a threshold force necessary to maintain said probe assembly at said predetermined distance;

a means for operating said force generating means to decrease the activating force on said probe assembly until said probe assembly advances through said predetermined distance at a velocity along the path from said approach position to said work surface; and means for monitoring said velocity to determine when said probe assembly makes said soft contact with said work surface.

9. A device as recited in claim 2 wherein said monitoring means comprises:

an encoder for fixing a transient position and a travel distance of said probe assembly from said approach position along said path;

a timer for corresponding each said transient position of said probe with a preselected time interval to ascertain said velocity for said advancement of said probe assembly along said path; and means for determining soft contact of said probe assembly with said work surface as being when said velocity is equal to zero.

* * * * *